United States Patent [19]
Logan

[11] Patent Number: 5,687,261
[45] Date of Patent: Nov. 11, 1997

[54] FIBER-OPTIC DELAY-LINE STABILIZATION OF HETERODYNE OPTICAL SIGNAL GENERATOR AND METHOD USING SAME

[75] Inventor: Ronald T. Logan, Levittown, Pa.

[73] Assignee: California Institute of Technology, Pasadena, Calif.

[21] Appl. No.: 590,863

[22] Filed: Jan. 24, 1996

[51] Int. Cl.$^6$ .................. G02B 6/28; H04B 10/06
[52] U.S. Cl. .................. 385/24; 385/11; 385/15; 385/42; 385/88; 385/89; 359/189; 359/191; 359/192; 359/195
[58] Field of Search .................. 385/15, 24, 31, 385/39, 42, 88, 89, 49, 11; 359/189, 190, 191, 192, 193, 194, 195, 127, 140

[56] References Cited

U.S. PATENT DOCUMENTS

| | | | |
|---|---|---|---|
| 4,798,467 | 1/1989 | Wyeth et al. | 372/32 |
| 4,817,101 | 3/1989 | Wyeth et al. | 372/32 |
| 4,903,341 | 2/1990 | Rice | 359/191 |
| 4,905,244 | 2/1990 | Wyeth et al. | 372/32 |
| 5,134,509 | 7/1992 | Olshansky et al. | 359/132 |
| 5,204,640 | 4/1993 | Logan, Jr. | 331/9 |
| 5,379,309 | 1/1995 | Logan, Jr. | 372/18 |

*Primary Examiner*—Brian Healy
*Attorney, Agent, or Firm*—Michaelson & Wallace

[57] ABSTRACT

The present invention is a laser heterodyne frequency generator system with a stabilizer for use in the microwave and millimeter-wave frequency ranges utilizing a photonic mixer as a photonic phase detector in a stable optical fiber delay-line. Phase and frequency fluctuations of the heterodyne laser signal generators are stabilized at microwave and millimeter wave frequencies by a delay line system operating as a frequency discriminator. The present invention is free from amplifier and mixer $1/f$ noise at microwave and millimeter-wave frequencies that typically limit phase noise performance in electronic cavity stabilized electronic oscillators. Thus, $1/f$ noise due to conventional mixers is eliminated and stable optical heterodyne generation of electrical signals is achieved.

30 Claims, 3 Drawing Sheets

FIBER-OPTIC DELAY-LINE STABILIZATION OF HETERODYNE OPTICAL SIGNAL GENERATOR AND METHOD USING SAME

ORIGIN OF THE INVENTION

The invention described herein was made in the performance of work under a NASA contract, and is subject to the provisions of Public Law 96-517 (35 USC 202) in which the contractor has elected to retain title.

BACKGROUND OF THE INVENTION

1. Field of the Invention

The present invention relates in general to microwave and millimeter-wave signal processing and transmission, and in particular to the stabilization of laser heterodyne frequency generators in the microwave and millimeter-wave frequency ranges.

2. Related Art

Stability of a typical frequency standard based upon laser heterodyne frequency generators is limited by the natural tendency of the laser heterodyne frequency to wander, producing phase noise in the system. Heterodyne sources do not have adequate phase and frequency stability for many applications. Although heterodyne signal generation provides a widely tunable source of frequency signals, which can be used in microwave and millimeter-wave signal transmission, up-conversion, down-conversion, and other signal processing functions, the phase and frequency stability of the heterodyne source often is not adequate for many applications. This is because the stability of the heterodyne beat frequency is limited by the absolute frequency stability of the lasers, which is typically poor compared to state-of-the-art electronic oscillators. In addition, although a single laser operating in two modes at slightly different frequencies can produce a heterodyne signal, the stability of this signal may be limited by the stability of the optical cavity of the laser.

One attempt to stabilize the heterodyne beat frequency is illustrated in FIG. 1. FIG. 1 is a heterodyned generator stabilization system 10 utilizing a reference signal as a stabilizer. A first laser 12 and a second laser 14 are combined in a coupler 16 to produce a dual-frequency optical signal. The dual-frequency optical signal is applied to a photodiode 20 which generates an electrical signal at the difference or "beat" frequency of the two lasers 12 and 14 by heterodyne detection. The electrical signal is applied to a phase detector 24 and compared to a stable reference frequency source 30. The output of the detector 24 is applied through a loop filter 26 in a negative feedback control loop to a tuning control input of the second laser 14, so as to stabilize the beat frequency.

In FIG. 1, the beat frequency signal is stabilized by phase-locking the heterodyned laser generator signal to a stable microwave or millimeter-wave electronic frequency reference signal 30 and by having the stable high frequency reference signal 30 generated by electronic means. However, at microwave and millimeter-wave frequencies, generating a stable reference signal is non-trivial. Thus, it would be desirable to eliminate the need for the stable electrical reference frequency in the heterodyne generator system 10. This is especially true at microwave and millimeter wave frequencies (above 10 GHz) where it becomes increasingly difficult or costly to generate a stable reference frequency, and also where it becomes increasingly difficult to phase-detect. In addition, although this system can reduce-heterodyne laser phase noise to the level of the reference oscillator phase noise, it is nevertheless limited by such noise.

A solution to similar stabilization problems for electronic oscillators is to stabilize the oscillator frequency using a frequency discriminator in a feedback loop. Referring to FIG. 2, if the oscillator 40 is a voltage controlled oscillator (VCO), the frequency control voltage of the VCO 40 is derived from the error or difference between the current phase of the oscillator output signal and the stored phase of the oscillator signal delayed from an earlier time. Typically, the error is measured in a delay line discriminator in which the oscillator signal of the earlier time is obtained by delaying the oscillator signal in a delay line 42, such as a coaxial cable and the phase difference is measured between the oscillator signals at the input and output of the delay line by a phase detector 44, as described in Andersen et al., "RF Signal Generator Single-Loop Frequency Synthesis, Phase Noise Reduction and Frequency Modulation," Hewlett Packard Journal, October 1989, pages 27–33.

One problem with oscillator stabilization using a delay line discriminator is that the sensitivity of the discriminator is limited by the length of the delay line. Any attempt to increase the sensitivity by increasing the delay requires a proportionate increase in the length of the delay line, which means that the discriminator is larger and heavier. Even a delay line length of 70 feet provides only a 70 nanosecond delay, which translates to relatively small discriminator sensitivity. Moreover, increasing the length of the delay line increases the signal losses therein and is ineffective at microwave and higher frequencies, due to high losses through metallic transmission media. Thus, it has not seemed practical to use a delay line discriminator for microwave or higher frequency (above 4 GHz) oscillators. Surface acoustic wave delay line devices have high insertion loss and are not widely tunable in a single device.

Another oscillator stabilization system with a fiber optic delay line discriminator is disclosed in U.S. Pat. No. 5,204,640, entitled WIDELY TUNABLE OSCILLATOR STABILIZATION USING ANALOG FIBER OPTIC DELAY LINE, issued on Apr. 20, 1993 to Logan, Jr. In this system the fiber optic delay line length is long (typically greater than 200 meters) to provide delays on the order of 1 microsecond or more. However, this system is used to stabilize an electronic oscillator and not for laser heterodyne frequency generators.

Therefore, it is an object of the invention to provide a heterodyne system for generating modulation of an optical carrier at sufficiently high frequencies for use with millimeter-wave systems with sufficient stabilization of the carrier generator free from amplifier and mixer $1/f$ noise at microwave and millimeter-wave frequencies. It is an additional object to provide a heterodyne system of this type that limits or eliminates $1/f$ noise due to conventional mixers. It is a further object to provide a heterodyne system of this type for producing stable optical heterodyne generation of electrical signals from D.C. to 1 TeraHertz (THz).

SUMMARY OF THE INVENTION

A pair of optical signals of different frequencies separated by a frequency difference equal to a desired output frequency (e.g., radio frequency, microwave frequency or millimeter-wave frequency) are combined together for transmission as a combined optical signal. Heterodyne photodetection of the combined optical signal produces an electrical signal at the desired output frequency. Phase and frequency fluctuations of the combined optical signal are detected by a fiber optic delay line frequency discriminator. In the fiber optic delay line discriminator, delayed and undelayed versions of the combined optical signal are phase compared to generate an error signal. The error signal is fed back in a negative feedback control loop to change the frequency of one of the pair of optical signals relative to the frequency of the other.

Preferably, the phase detection by the fiber optic delay line discriminator is performed by applying the delayed and undelayed versions of the combined optical signal in a predetermined phase relationship (such as phase quadrature) to different inputs of a phase detector. The error signal is the output of the phase detector.

An all-electrical phase detector may be employed, in which case both the delayed and undelayed versions of the combined optical signal are separately photodetected prior to being applied to respective inputs of the phase detector. A hybrid electro-optical phase detector may be employed having an electrical input, an optical input and an optical output, in which case only one of the delayed and undelayed versions of the combined optical signal need be photodetected prior to being applied to the phase detector, and the output of the phase detector must be photodetected. An all-optical phase detector may be employed, in which case only the output of the phase detector is photodetected.

Various sources of the pair of optical signals may be employed in carrying out the invention. The pair of optical signals may be contained in a comb of optical frequencies of the type produced by a self-pulsating laser diode, a passively mode-locked laser or a self-mode locked laser. Alternatively, the pair of optical signals may be produced by a dual-mode laser or may be produced separately by a pair of respective individual lasers. The pair of lasers may be locked to respective modes of a mode-locked laser.

The present invention surpasses the stability of previous electronic systems for microwave and millimeter-wave signal generation by reducing or eliminating the amplifier and mixer phase noise. In addition, the present invention eliminates the need for an electrical reference oscillator. One embodiment of the present invention is also free from amplifier and mixer 1/f noise at microwave and millimeter-wave frequencies that typically limit phase noise performance in cavity-stabilized electronic oscillators. Thus, since the 1/f noise due to conventional mixers may be reduced or eliminated, stable optical heterodyne generation of electrical signals is achieved that may exceed the stability achievable with electronic techniques.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part-hereof, and in which is shown by way of illustration a specific embodiment in which the invention may be practiced. It is to be understood that other embodiments may be utilized and structural changes may be made without departing from the scope of the present invention.

Figure 1:
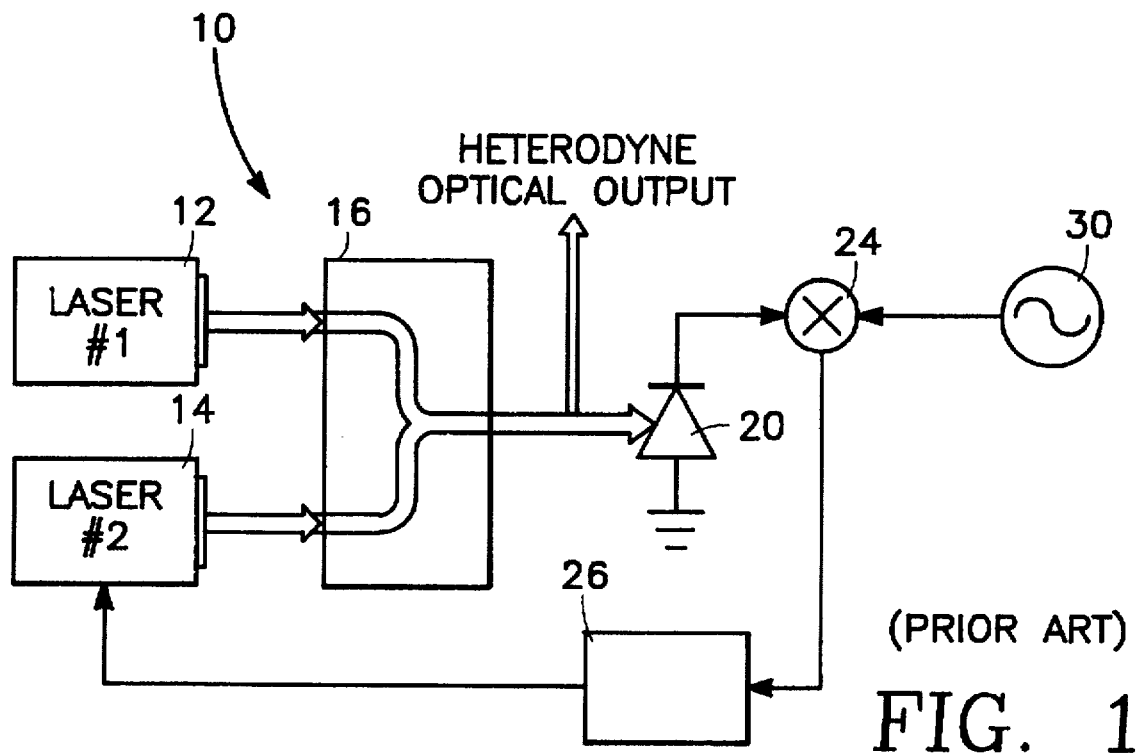
FIG. 1 is a block diagram illustrating a heterodyned laser generator stabilization system of the prior art using a reference signal.
Figure 2:
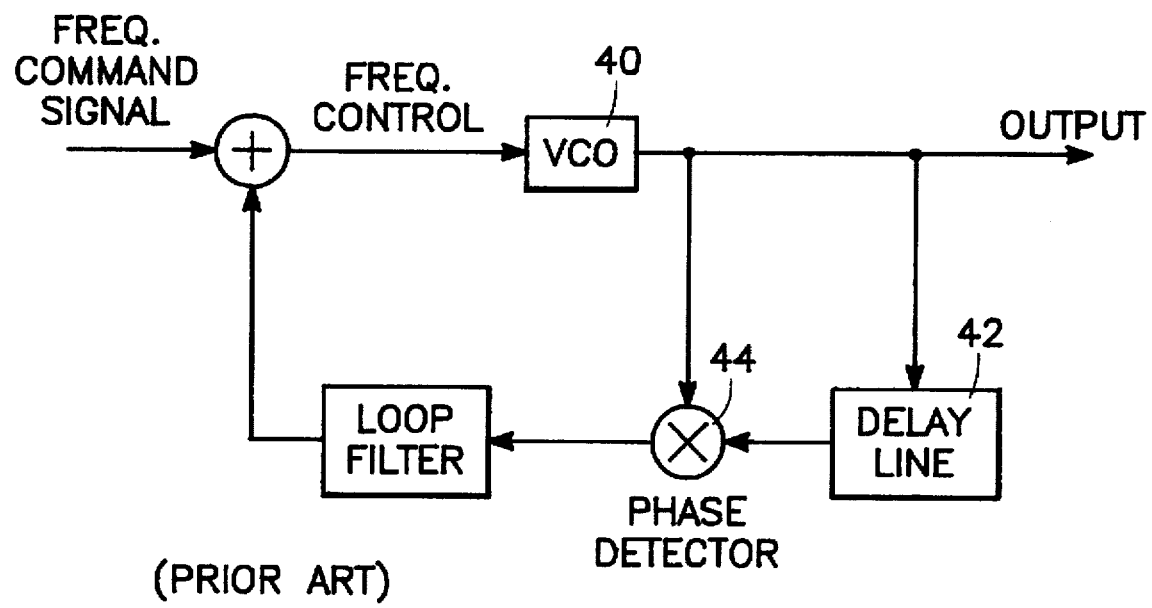
FIG. 2 is a block diagram illustrating a stabilization system for electronic oscillators of the prior art using a fiber optic delay-line frequency discriminator.
Figure 3:
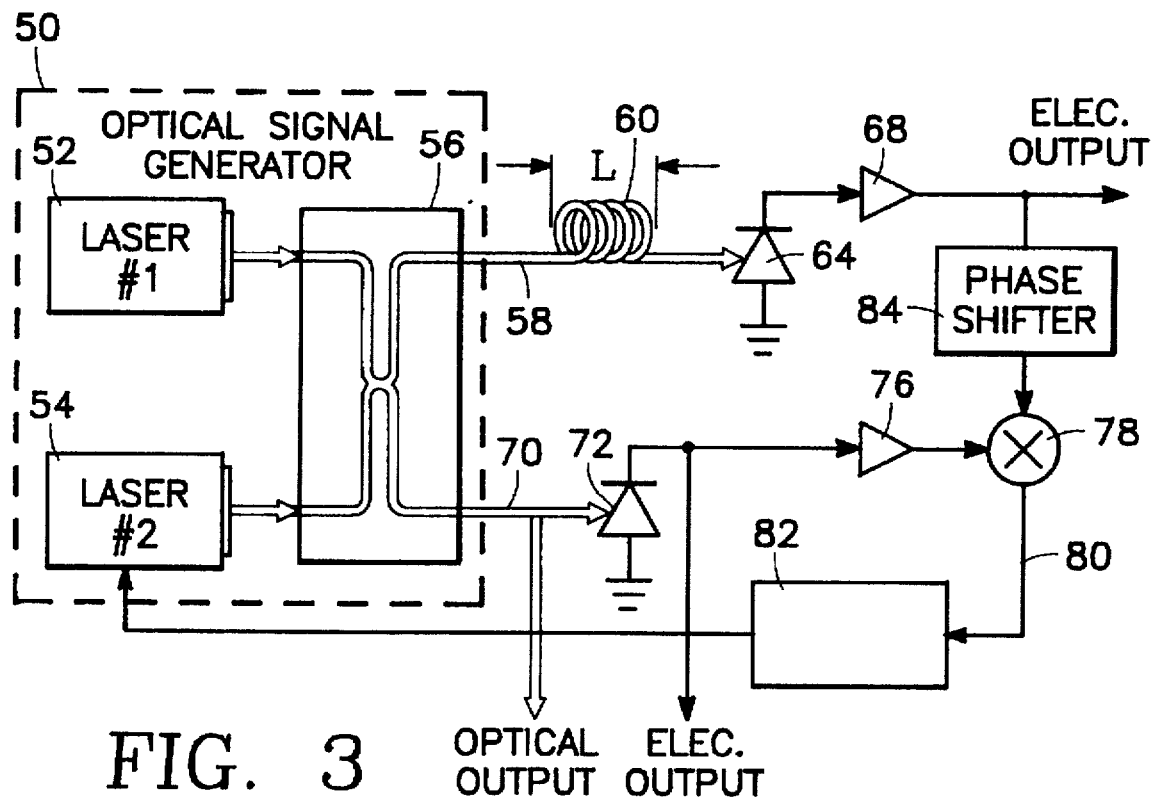
FIG. 3 is a block diagram illustrating a first embodiment of a fiber optic delay line stabilization system of the present invention.

Referring to FIG. 3, an optical signal generator 50 produces the same combined optical output signal at its two outputs 58, 70. The combined optical output signal consists of a pair of monochromatic optical signals of different optical frequencies separated by a difference or "beat" frequency equal to a desired radio frequency, microwave frequency or millimeter-wave frequency. The combined optical output signal produces an electrical signal at the beat frequency upon heterodyne detection by a photodiode.

In the implementation illustrated in FIG. 3, the optical signal generator consists of a first laser 52 and a second laser 54 that can be frequency-offset from each other so that the optical outputs of the first and second lasers 52 and 54 operate at optical frequencies of $\omega_1$ and $\omega_2$ respectively. The lasers 52 and 54 are offset in frequency by the desired difference or beat frequency corresponding to a desired millimeter wave or microwave communication frequency. The lasers 52 and 54 can be narrow-linewidth continuous wave standard semiconductor laser diodes. Also, the first laser 52 is a fixed-frequency device, while the second laser 54 is a variable frequency device with frequency tuning by a tuning device (not shown), such as a temperature or a piezo-electric device. The optical outputs of the lasers 52 and 54 are combined in a fiber optic coupler 56 having two outputs 58, 70. The polarization state of the first laser 52 can be adjusted prior to entering the fiber optic coupler 56 so that the first laser signal 52 is co-linear with the second laser signal 54, although this may not be necessary if there is a sufficient amount of optical scattering. In one embodiment, the two lasers 52, 54 may be mode-locked to respective modes of a single mode-locked laser corresponding to the two optical frequencies.

Alternatively, the two lasers 52, 54 and their fiber optic coupler 56 can be replaced by a single dual-mode laser 55 indicated in dashed line in FIG. 3. The same is true of the embodiments described in detail below with reference to FIG. 4 and with reference to FIG. 5. Such a dual mode laser is disclosed in Logan et al., "Millimeter-Wave Photonic Downconvertors: Theory and Demonstrations", *Proceedings of the SPIE Conference on Optical Technology for Microwave Applications VII*, San Diego, Calif., Jul. 9–14, 1995.

As yet another alternative embodiment, the two lasers 52, 54 may be replaced by a single self-pulsating laser diode or a self-mode-locked laser whose output is a comb of optical frequencies containing the desired pair of optical frequencies separated by the desired beat frequency.

A first output 58 of the coupler 56 is coupled to the input of a fiber optic delay line 60. Preferably, the fiber optic delay line 60 is a long single-mode optical fiber of length L. The length L can be on the order of 12 to 20 kilometers in length and wound in a spool of about 6 or 8 inches in diameter and about 1 inch thick. However, any other suitable length may be employed in carrying out the invention.

The delayed optical signal from the delay line 60 is detected by a first photodiode 64. The first photodiode 64 converts the delayed optical signal to generate a first electrical output signal. The delayed electrical output signal is amplified by a first amplifier 68 for producing an amplified delayed signal from the electrical output signal. A second optical output 70 of the coupler 56 is coupled to a second photodiode 72, which generates a second undelayed electrical signal. The second electrical signal is amplified by a second amplifier 76. Optical amplifiers may also be distributed at intervals along the entire length of the fiber optic delay line 60. The amplifiers 68 and 76 may be of the type well known in the art.

The output signals from the first amplifier 68 and the second amplifier 76 are coupled to a conventional electrical phase detector, such as a conventional double-balanced mixer 78. Initially, the delayed output signal from the first amplifier 68 and the undelayed output signal from the second amplifier 76 preferably are in phase quadrature when coupled to the phase detector 78. To achieve this initial phase relationship, the delayed output of the first amplifier 68 is coupled to an adjustable phase shifter 84. The adjustable phase shifter 84 at one input to the phase detector 78 imposes the requisite degree phase shift to achieve phase quadrature.

Alternatively, in lieu of the adjustable electronic phase shifter 84, a conventional optical phase shifter could be provided at the output of either the delay line 60 or the coupler output 70. This alternative may actually be preferable, since a typical optical phase shifter has wider bandwidth than an electronic phase shifter.

If the optical signal generator 50 consists of the two individual lasers 52, 54 illustrated in FIG. 3, then the output signal from phase detector output 80 controls the frequency of the second laser 54 by negative feedback through a conventional loop filter-amplifier 82. In this case, the error signal at the output of the loop filter amplifier 82 applied to a control input of the laser 54 which controls the frequency of the laser 54 by conventional means such as a piezoelectric device governing the effective laser cavity length, for example. The filter-amplifier 82 may be a conventional low-pass filter which responds to non-zero voltages changes from signal 80. Alternatively, other types of filters may be employed by the skilled worker, depending upon the tuning response requirements in a specific application of the invention.

If the optical signal generator is a dual laser, then the error signal at the output of the loop filter amplifier 82 tunes the frequency separation of the two frequencies by a piezoelectric device governing the effective laser cavity length. If the optical signal generator 50 is of the type including a self-pulsating laser diode or a self-mode-locked laser which produces a comb of optical frequencies, then the error signal at the output of the loop filter amplifier 82 is applied to a control input of the generator 50 which governs the frequency difference between adjacent modes. In this way, the error signal either expands or contracts the comb of optical frequencies so that the change in frequency of the pair of monochromatic optical signals of interest is relative. In the case of a self-pulsating laser diode, the output from the loop filter amplifier 82 may be applied to a D.C. bias electrode. In the case of the self-mode-locked laser the output of the loop filter amplifier 82 may be applied to a piezo-electric device governing the effective laser cavity length.

Unlike coaxial cable delay lines of the prior art, the fiber optic delay line 60 exhibits a wide bandwidth on the order of hundreds of GHz. Therefore, in accordance with one feature of the invention, the frequency of the second laser source 54 can be tuned over this frequency range by piezo-electric or temperature control means. For this purpose, the phase shifter 84 imposes a variable phase shift which slews changes in the second laser source 54 frequency in order to establish phase quadrature once the desired first laser source 52 frequency has been reached. Together, the fiber optic delay line 60, the phase detector 78 and the adjustable phase shifter 84 comprise a delay line discriminator.

Specifically, tuning of the second laser source 54 can be performed by sending a signal to a tuning control input of the second laser source 54 to allow the frequency and phase fluctuations of the laser sources 52 and 54 to be reduced in an amount proportional to the net loop gain G(f) of the loop filter 82. Ultimately, the closed-loop stability will be limited by the intrinsic phase noise of the amplifiers 68 and 76, phase detector 78, and delay line 60. Additional increases in loop gain G(f) will not improve the stability further beyond this. The closed-loop double-sideband (DSB) phase noise power spectral density, in the limit of large loop gain, is:

$$S(f) = \frac{S_d(f)}{(2\pi f\tau)^2} \; [\text{rad}^2/\text{Hz}]$$

where $S_d(f)$ is the open-loop DSB phase noise in rad²/Hz of the delay line and the active components in the loop, $f$, is the offset frequency from the beat frequency between the lasers 52 and 54, and $\tau$ is the delay time provided by the fiber.

Figure 4:
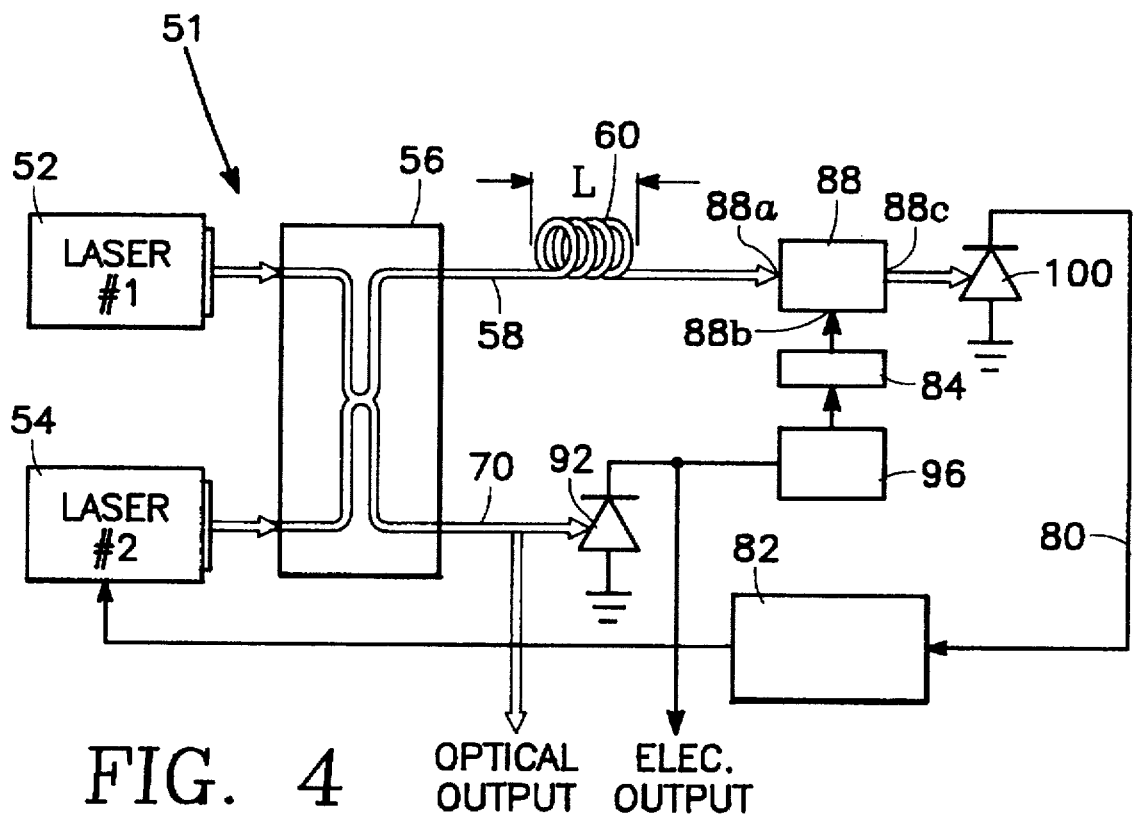
FIG. 4 is a block diagram illustrating a second embodiment of a fiber optic delay line stabilization system of the present invention.

FIG. 4 illustrates the delay-line stabilized heterodyne signal generator utilizing an electro-optical phase detector 88 in lieu of the electrical phase detector 78 of FIG. 3. The photonic phase detector 88 may be an electro-optic (E/O) intensity modulator, having input ports 88a, 88b receiving the delayed optical signal and an electrical signal derived from the undelayed optical coupler output 70, and one optical output port 88c, or vice-versa. The undelayed optical coupler output 70 is sent to a second photodetector 92, such as a millimeter-wave photodiode, whose output can be reactively matched in a narrow frequency range using a passive matching network device 96 connected to the electro-optical phase detector input 88b.

As in the embodiment of FIG. 3, at the phase detector input 88a in FIG. 4 the delayed optical signal at the phase detector input 88a and the undelayed electrical signal at the phase detector 88b must be at least nearly in phase quadrature. Therefore, an adjustable electronic phase shifter 84 imposes the requisite phase shift at the phase detector input 88b to achieve phase quadrature. (Alternatively, in lieu of the electronic phase shifter 84, an optical phase shifter may be placed at the phase detector output 88a.) Also, an amplifier 98 can be coupled to the matching network 96, if required to achieve sufficient input level.

The phase detector 88 is a modulator which functions analogous to an electronic mixer, wherein the modulation of the optical input signal is analogous to a local oscillator (LO) mixer input of the electronic mixer, and the electrical input signal 90 is analogous to a signal (RF) mixer input port of the electronic mixer. The optical input 88a and the electrical input 88b are multiplied by the modulator 88, with the result appearing as a complex optical modulation output signal. The photodiode 100 detects the complex output signal. The detected output signal is an optical photocurrent representing the multiplication of the optical signal 62 and electrical signal 90 so that:

$$i_{out}(t) = I_1 + I_2 + 2\sqrt{I_1 I_2} \; \cos(2\pi F_{mmw}t + \phi(t)) +$$

-continued $$m(I_1+I_2)\sin(w_m t+\phi_m)-m\sqrt{I_1 I_2}\ \sin(2\pi F_{mm}t-w_m t+\phi(t)-\phi_m)$$

where $I_1$ and $I_2$ are the DC photocurrents due to each of the lasers, $\omega$ is the modulation index of the optical modulator at the undelayed output signal frequency $\omega_m$, and DC phase bias $\phi_m$, and $\phi(t)$ represents the phase fluctuations of the delayed optical signal at frequency $F_{mm}$.

When the delayed signal and the undelayed signal are the same frequency and arranged in phase quadrature so that $2\pi F_{mm}t-\omega_m t=0$ and $\phi_m=0$, the detected photocurrent at baseband $i_{bb}(t)$ is linearly proportional to the phase fluctuations between the LO and RF signals so that: (This expression assumes that the optical power from the two $$i_{bb}(t)=2I-mI\phi(t)$$

lasers 52 and 54 are equal so that $I_1=I_2=I$, and $\phi(t) <0.1$ radians at maximum or peak). Thus, the detected signal at the photodiode 100 represents the phase fluctuations which are to be compensated or nullified. Hence, from this expression, the phase detector coefficient for the photonic mixer is $K_\phi=-mI$ [amps/radian]. For the delay-line discriminator, the conversion factor from carrier frequency fluctuations $\Delta F_{mm}$ (t) to output baseband photo-current fluctuations will be:

$$\delta i(t)=(2\pi\tau K_\phi)\Delta F_{mm}(t)=(2\pi\tau mI)\Delta F_{mm}(t)$$

Also, the power spectral density of this current is:

$$S_{\delta i}(f)=(2\pi\tau mI)^2 S_{\Delta F_{mm}}(f)\ [amps^2/Hz]$$

where $S_{\Delta F_{mm}}$ (f) [Hz²/Hz] is the power spectral density of the beat frequency fluctuations. The signal detected at the photodiode 100 (representing the frequency noise) is fed back through a loop filter 82 to the frequency tuning input control of the optical signal generator 50 in a phase locked loop to nullify the frequency fluctuations or phase noise. The filter 82 is a conventional low-pass filter.

For sufficiently high optical power levels, the shot noise of the DC photocurrent $I_1+I_2=2I$ will be the dominant noise source. This will generate a white current noise power spectral density of:

$$S_{shot}(f)=4eI\ [amps^2/Hz]$$

where e is the electronic charge in Coulombs, and represents the minimum detectable frequency fluctuation by the delay-line discriminator. In the limit of large gain in the closed-loop, the current fluctuations due to frequency fluctuations will be equal to the shot noise level. Thus, the frequency fluctuations of the closed loop can be predicted by setting the last two expressions equal, and solving for $S_{\Delta F}(f)$ to obtain:

$$S_{\Delta F}=\frac{4eI}{(2\pi\tau mI)^2}=\frac{e}{(\pi\tau m)^2 I}\ [Hz^2/Hz]$$

Although the shot noise power increases linearly with photocurrent, the power of current fluctuations due to the source frequency fluctuations of the system 51 increases as the optical power is squared. The net result is that the delay-line discriminator sensitivity increases faster than the noise floor. As a result, the closed-loop frequency fluctuations are inversely proportional to the photocurrent. Hence, the closed loop frequency fluctuations can be made arbitrarily small by increasing the photocurrent. Consequently, the saturation level of the photodiode 68 will limit the maximum current level, and thus, limit the closed-loop frequency fluctuations. However, since the photodiode 100 only operates at frequencies near D.C., one or more large-junction-area devices with a high saturation current level may be used.

The phase noise performance of the oscillator can be estimated. For instance, for a 10 km length of optical fiber with a modulation index m=0.5 and photocurrent I=1 mA a white power spectral density of frequency fluctuations is estimated as follows:

$$S_{\Delta F}(f)=2.1\cdot 10^{-8}\ [Hz^2/Hz]=-76.6\ dB\ Hz/Hz$$

(dB Hz=dB relative to 1Hz)

This corresponds to a phase noise power spectral density of:

$$S_\phi(f)=\frac{S_{\Delta F}(f)}{f^2}=-76.6/f^2\ [dB\ rad/Hz]$$

at the offset frequency f from the carrier. The minimum phase noise due to the optical shot noise is independent of the output frequency 99 ($F_{mm}$). Thus, it is advantageous to operate this oscillator at the highest frequency permitted by the phase detector 88 and the photodiode 92.

Figure 5:
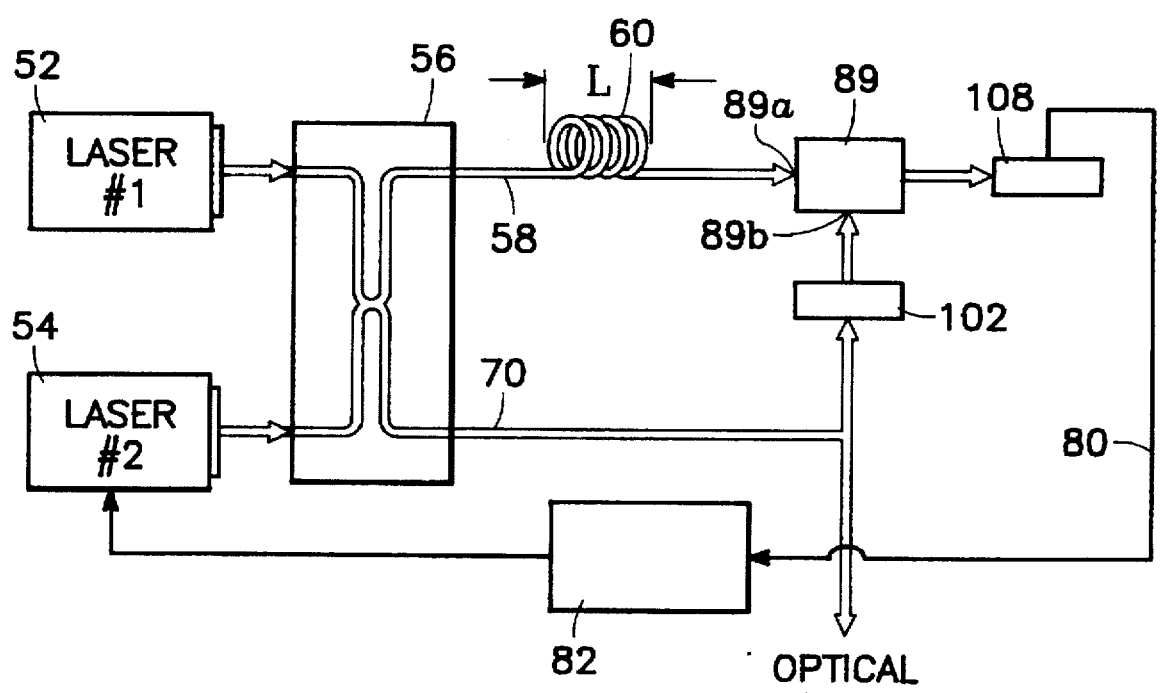
FIG. 5 is a block diagram illustrating a third embodiment of a fiber optic delay line stabilization system of the present invention.

FIG. 5 is an all-optical embodiment of the fiber optic delay line stabilization system of the invention. An all optical phase detector 89 replaces the phase detector 88 of FIG. 4. Also, the optical coupler output 70 is coupled to an adjustable optical phase shifter 102, which may be of the type well known in the art. The optical signals coupled to inputs 89a, 89b of the phase detector 89 preferably are in phase quadrature. Therefore, the adjustable optical phase shifter 102 imposes an appropriate phase shift at the phase detector input 88a to establish phase quadrature. The output of the optical phase detector 89 is detected by a detector 108 whose output is coupled through a loop filter 82 as feedback to the tuning input of laser #2.

The embodiment of FIG. 5 can be realized in any one of three implementations. In all three implementations, any optical signals are applied to the phase detector input 89a and 89b. One of the optical inputs, such as input 89a, is a control input, while the other input, such as input 89b, is a signal input. The first implementation uses amplitude modulation by the phase detector 89, which can be an optical switch. In this case, the detector 108 is an amplitude detector, such as a photodiode. The second implementation uses frequency modulation by phase detector 89, which, for this purpose, can be an acousto optical crystal. In this case the detector 108 can be a frequency sensitive detector, such as a tuned optical cavity, with a photodiode for converting the optical signal into an electrical signal. The third implementation uses phase modulation by the phase detector 89, which can be an optical medium, such as an optical crystal, whose index of refraction changes with the amplitude of the optical control signal on the control input 89b. The detector 108, in this case, must be a phase sensitive detector or at least a detector sensitive to changes in phase, such as a tuned cavity, with a photodiode for converting the optical signal into an electrical signal. In all three implementations, the loop filter 82 operates in a similar fashion as the loop filter 82 of FIG. 4.

It has been shown theoretically that $1/f$ noise is not generated when an electrical current is created due to optical absorption in the photodiode 100 (FIG. 4) or 108 (FIG. 5). As a result, several sources of $1/f$ noise in the microwave signal path are eliminated in the embodiments of FIGS. 4 and 5. If an amplifier is necessary, or there is another source of 1/ƒ noise, then the frequency fluctuations will be limited by this source instead of the shot noise, as calculated above. In this case, fiber length fluctuations will be the limitation.

Another potential noise source is fluctuation of the laser intensity. This noise source creates a corresponding low-frequency current fluctuation in the photocurrent at the IF output 92. However, this noise source is independent of the heterodyne frequency so that its effect would be diminished as the operating frequency increases. Although this would limit the performance of this scheme at lower operating frequencies, a low-frequency local feedback loop could be employed on each laser 52 and 54 to reduce this potential noise source.

In addition, as the photocurrent is increased the effect of shot noise is diminished. As a result, in the absence of any other noise sources, the phase noise performance of the delay-line stabilized heterodyne oscillator 60 will be limited by the 1/ƒ noise of the baseband gain elements. These elements have the same noise performance regardless of the heterodyne frequency, thus, the closed-loop phase noise will be independent of the operating frequency. Consequently, it is advantageous to operate the heterodyne oscillator at the highest frequency possible to achieve the best relative phase noise performance. Also, lower frequencies, as needed, can be obtained by frequency division, with the advantage that the phase noise of the divided output is reduced by the division factor. This is the inverse of the multiplicative effect on phase noise when a low frequency signal is multiplied to obtain a high-frequency output.

While the invention has been described in detail with specific reference to stabilizing a heterodyne signal source consisting of two separate lasers, one of which is controlled in the feedback control loop of the invention, the invention is useful for stabilizing any heterodyne signal source such as the dual mode laser specifically referred to above in this specification, or any sort of laser/electro-optic system that produces at least two heterodyne output signals which upon photodetection yield an electrical signal lying in the range of RF through millimeter-wave frequencies.

A Method of Setting the Heterodyne Frequency Difference

While the invention described above provides optimal stabilization of the heterodyne signal, it is, in addition, highly useful for accurately setting the heterodyne frequency difference to a desired value in accordance with a method of the invention. This method proceeds as follows:

The delay line 60 provides a stable locking point at discrete frequency intervals separated by 1/τ, where τ is the delay time of the optical fiber delay line 60. As the heterodyne frequency difference between the two lasers 12, 14 is increased linearly over time, the output of the phase detector (78 in FIG. 3, 88 in FIG. 4 or 89 in FIG. 5) is a sine-wave time domain waveform centered about zero volts with a zero-crossing every half cycle. The desired difference frequency of heterodyne frequency offset is achieved by initially setting the difference frequency to a known value (for example, 10 MHz). This may be achieved by employing a conventional 10 MHz reference frequency source such as a commercially available integrated circuit. In doing so, a conventional microprocessor may be employed to perform the comparison. Then, the frequency of the tunable laser 14 is slewed linearly while the zero-crossings of the phase detector 78 are counted until the desired heterodyne difference frequency is reached. The slewing of the laser output frequency and the counting of the phase detector zero-crossings could be performed simultaneously by the same microprocessor that was employed to perform the initial comparison described immediately above. The resolution of the final difference frequency set point is 1/τ. If, for example, the fiber optic delay line is 10 kilometers, then the frequency resolution is 18 kHz, and the set point is adjusted in 18 kHz steps. After the desired difference frequency set point has been achieved, the invention operates as described previously in this specification to stabilize the heterodyne difference frequency.

Applications

The signal source of the present invention could be used in microwave and millimeter-wave systems, including the NASA/JPL Deep Space Network, military applications, commercial personal communications systems, wireless local area networks, satellite communications systems, and collision avoidance and air traffic control radars. The advantages of using millimeter-wave frequencies for personal cellular communications are many. The small wavelengths of millimeter-waves allow the antennas to be very small. Also, the natural absorption of certain millimeter-wave bands by the atmosphere makes them well-suited to local-area wireless systems where long-distance propagation is undesired.

A stable heterodyne laser generator allows practical use of photonic upconversion and downconversion for microwave and millimeter-wave signal processing. This technology represents a building-block in the high capacity/high frequency telecommunications area and allows easier access to the millimeter-wave regions of the electromagnetic spectrum.

The present invention is also ideal for commercial applications, such as personal wireless telecommunication systems. The photonic system of the present invention enables easier access to regions of the electromagnetic spectrum in the microwave and millimeter-wave range than is currently practical. With the growing demand for personal wireless communications services, the electromagnetic spectrum is becoming increasingly crowded. Access to millimeter-wave frequencies will enable new wireless personal communications systems at high-frequencies, where antennas can be made very small.

Photonic systems could be used to remote these microcellular antennas using optical fiber. Using photonic upconversion and downconversion, the equipment located at the antenna would only consist of a photodiode and power amplifier for transmission, a low noise amplifier (LNA), an electro-optic modulator to receive, and the antenna itself. Previously, all of the upconversion and downconversion equipment would have been located in an enclosure at the antenna, making such a system prohibitively expensive and complicated.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A heterodyne generator circuit, comprising:
   a dual optical signal source having a first signal and a second signal and means for combining said first and second signals for producing a combination of a first optical output signal and a second optical output signal respectively, wherein said first optical output signal is offset in frequency from said second optical output signal;

delay line means comprising a long optical fiber receiving at one end thereof said combination of said first and second optical output signals and transmitting at an opposite end thereof a delayed version thereof;

phase detector means for detecting a change in a phase relationship between said combination of said first and second optical output signals and said delayed version thereof; and means responsive to said phase detector means for stabilizing said frequency of said heterodyne generator device by changing the frequency of one of said first and second optical output signals relative to the other so as to counteract said change in said phase relationship between said combination of said first and second optical output signals and said delayed version thereof.

2. The circuit of claim 1 wherein said phase detector means and said delay line means comprise a delay line discriminator characterized by a sensitivity which is a function of the length of said optical fiber, said delayed optical signal is attenuated in said optical fiber as a function of said length, and said length is such as to optimize said sensitivity against said attenuation.

3. The circuit of claim 1 further comprising phase shift means for maintaining a predetermined phase relationship between said combination of said first and second optical output signals and said delayed version thereof as detected by said phase detector means.

4. The circuit of claim 3 wherein said predetermined phase relationship is phase quadrature.

5. The circuit of claim 3 wherein said phase detector means comprises an electronic phase detector having two inputs, said circuit further comprising:

a first photodetector means for converting said combination of first and second optical output signals to a first electrical output signal;

a second photodetector means for converting said delayed version of said combination of said first and second optical output signals to a second electrical output signal, wherein said two inputs are connected, respectively, to receive said first and second electrical output signals.

6. The circuit of claim 3 wherein said phase detector means is an electro-optic phase detector having an electronic input and an optical input, said circuit further comprising a photodetector means for converting one of said combination and the delayed version thereof to an electrical output signal for connection to the electrical input of said phase detector means, the other one of said combination and the delayed version thereof being connected to the optical input of said phase detector means.

7. The circuit of claim 3 wherein said phase detector means comprises an optical phase detector having two optical input ports and one optical output port, wherein said two input ports are connected, respectively, to receive said combination of said first and second optical output signals and said delayed version thereof to generate an optical output signal at said output port, said circuit further comprising:

a detector for converting said optical output signal of said optical phase detector to an electrical output signal.

8. The circuit of claim 7 wherein said optical phase detector comprises an amplitude modulator and said detector is a photodiode.

9. The circuit of claim 7 wherein said optical phase detector comprises a frequency modulator and wherein said detector is a frequency sensitive detector.

10. The circuit of claim 9 wherein said frequency modulator is an acousto optic crystal and said frequency sensitive detector is a tuned optical cavity.

11. The circuit of claim 7 wherein said optical phase detector comprises a phase modulator and wherein said detector is a phase sensitive detector.

12. The circuit of claim 11 wherein said phase modulator is an optical medium whose index of refraction changes with an amplitude of said second optical output signal.

13. The circuit of claim 12 wherein said phase sensitive detector is a tuned optical cavity.

14. The circuit of claim 4 wherein said means for changing the frequency of one of said first and second optical output signals comprises:

a loop filter connected to an output of said phase detector means; and means for connecting said loop filter to a frequency control input of said heterodyne generator.

15. A heterodyne generator circuit, comprising:

a dual optical signal source having a first signal and a second signal and means for combining said first and second signals for producing a combination of a first optical output signal and a second optical output signal respectively, wherein said first optical output signal is offset in frequency from said second optical output signal;

delay line means comprising a long optical fiber receiving at one end thereof said combination of said first and second optical output signals and transmitting at an opposite end thereof a delayed version thereof;

phase detector means for detecting a change in a phase relationship between said combination of said first and second optical output signals and said delayed version thereof; and means responsive to said phase detector means for changing the frequency of one of said first and second optical output signals relative to the other so as to counteract said change in said phase relationship;

wherein said heterodyne generator device comprises first and second continuous wave lasers each with co-linear polarization states for producing said first optical output signal and said second optical output signal, respectively, and a coupler receiving said first optical output signal and said second optical output signal.

16. The circuit of claim 6 wherein said phase shift means comprises an optical phase shifter coupled to the optical input of said electro-optic phase detector.

17. The circuit of claim 7 wherein said phase shift means comprises an optical phase shifter coupled to one of the optical input ports of said optical phase detector.

18. A method for stabilizing an optical heterodyne generator having a first signal and a second signal and means for combining said first and second signals for producing a combination of a first optical output signal and a second optical output signal, wherein said first optical output signal is offset in frequency from said second optical output signal by a difference frequency, said method comprising:

providing a fiber optic delay line;

transmitting through said fiber optic delay line said combination of said first and second optical output signals to produce a delayed version of said first and second optical output signals;

generating an error signal by sensing a phase difference between said combination of said first and second optical output signals and the delayed version thereof; and feeding back said error signal derived from said phase difference between said combination of said first and second optical output signals and the delayed version thereof to said heterodyne generator so that a frequency of said second output signal is changed relative to the other in such a way to decrease said error signal.

19. The method of claim 18 further comprising selecting the length of said fiber optic delay line for an optimum sensitivity at said difference frequency.

20. The method of claim 19 wherein said difference frequency is in the range of a millimeter wave frequency and the length of said fiber optic delay line is on the order of 10 kilometers.

21. The method of claim 18 further comprising:
maintaining a pre-determined phase relationship between the signals sensed by said sensing step.

22. The method of claim 21 wherein said predetermined relationship is phase quadrature.

23. The method of claim 21 further comprising the step of amplifying said combination of said first and second optical output signals at intervals along the length of the optical fiber delay line.

24. The method of claim 18 wherein the step of sensing a phase difference comprises modulating one of said combination and the delayed version thereof by the other.

25. The method of claim 24 further comprising converting the output of the modulation step from an optical signal to an electronic signal.

26. The method of claim 24 wherein the step of modulating employs one of:
amplitude modulation;
frequency modulation; and
phase modulation.

27. A method for stabilizing an optical heterodyne generator having a first signal and a second signal and means for combining said first and second signals for producing a combination of a first optical output signal and a second optical output signal, wherein said first optical output signal is offset in frequency from said second optical output signal by a difference frequency, said method comprising:
providing a fiber optic delay line;
transmitting through said fiber optic delay line said combination of said first and second optical output signals to produce a delayed version of said first and second optical output signals;
sensing a phase difference between said combination of said first and second optical output signals and the delayed version thereof, whereby to generate an error signal;
feeding back said error signal to said heterodyne generator so that a frequency of said second output signal is changed relative to the other in such a way to decrease said error signal;
further comprising the following preliminary steps for setting said difference frequency:
changing the frequency of one of said first and second optical output signals;
counting zero-crossings sensed by the step of sensing a phase difference; and
fixing said frequency of said one output signal upon a predetermined number of zero-crossings being counted in said counting step.

28. The method of claim 27 wherein said fiber optic delay line has a delay $\tau$ and wherein said predetermined number of zero crossings is a function of the difference between and initial frequency of said one output signal and the frequency of said one output signal at which the desired difference frequency is obtained divided by $\tau^{-1}$.

29. The method of claim 28 wherein said changing step is preceded by a step of setting said difference frequency to a known value.

30. A circuit for stabilizing a frequency of a heterodyne generator having a first signal and a second signal and means for combining said first and second signals for producing a combination of a first optical output signal and a second optical output signal respectively, wherein said first optical output signal is offset in frequency from said second optical output signal by a difference frequency, said method comprising:
a optical fiber delay line for producing a delayed version of said combination of said first and second optical output signals;
a phase detector for generating an error signal by sensing a phase difference between said combination of said first and second optical output signals and the delayed version thereof; and
means for feeding back said error signal derived from said phase difference between said combination of said first and second optical output signals and the delayed version thereof to said generator to effect a change in frequency of one of said first and second optical output signals relative to the other to reduce said error signal.

* * * * *